(12) United States Patent
Karmarkar et al.

(10) Patent No.: US 8,472,986 B2
(45) Date of Patent: Jun. 25, 2013

(54) METHOD AND SYSTEM OF OPTIMIZING CONTEXT-DATA ACQUISITION BY A MOBILE DEVICE

(75) Inventors: Amit Karmarkar, Palo Alto, CA (US); Richard Peters, Mission Viejo, CA (US)

(73) Assignee: Buckyball Mobile, Inc., Palo Alto, CA (US)

( * ) Notice: Subject to any disclaimer, the term of this patent is extended or adjusted under 35 U.S.C. 154(b) by 429 days.

(21) Appl. No.: 12/838,418

(22) Filed: Jul. 16, 2010

(65) Prior Publication Data

US 2011/0014933 A1 Jan. 20, 2011

Related U.S. Application Data (63) Continuation-in-part of application No. 12/422,313, filed on Apr. 13, 2009, and a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
*H04W 4/14* (2009.01)

(52) U.S. Cl.
USPC ........... 455/466; 370/328; 370/349; 426/576; 424/456; 514/17; 514/18; 514/19

(58) Field of Classification Search
USPC ......................................................... 455/466
See application file for complete search history.

(56) References Cited

U.S. PATENT DOCUMENTS

| | | | |
|---|---|---|---|
| 6,611,755 B1 * | 8/2003 | Coffee et al. | 701/213 |
| 6,847,892 B2 * | 1/2005 | Zhou et al. | 701/213 |
| 7,738,912 B1 * | 6/2010 | Hawkins et al. | 455/550.1 |
| 7,742,774 B2 * | 6/2010 | Oh et al. | 455/456.1 |
| 7,869,796 B2 * | 1/2011 | Lee et al. | 455/412.2 |
| 2005/0136994 A1 * | 6/2005 | Bahl et al. | 455/574 |
| 2005/0188273 A1 * | 8/2005 | Angelo et al. | 714/39 |
| 2005/0221820 A1 * | 10/2005 | Ruetschi | 455/432.3 |
| 2006/0019724 A1 * | 1/2006 | Bahl et al. | 455/574 |
| 2006/0223518 A1 * | 10/2006 | Haney | 455/420 |
| 2007/0032244 A1 * | 2/2007 | Counts et al. | 455/456.1 |
| 2007/0197229 A1 * | 8/2007 | Kalliola et al. | 455/456.1 |
| 2007/0254593 A1 * | 11/2007 | Jollota et al. | 455/67.11 |
| 2008/0171555 A1 * | 7/2008 | Oh et al. | 455/456.1 |

* cited by examiner

*Primary Examiner* — Lester Kincaid
*Assistant Examiner* — Diego Herrera (57) ABSTRACT

Disclosed are a system, method, and article of manufacture for optimization of context-data acquisition by a mobile device. A term of a short message generated with a mobile device is identified. A list is populated with at least one sensor of the mobile device. The list is sorted according to a specified metric. A physical quantity of an environmental attribute of the mobile device is measured with a first listed sensor. The measurement is converted into a context data.

21 Claims, 8 Drawing Sheets

METHOD AND SYSTEM OF OPTIMIZING CONTEXT-DATA ACQUISITION BY A MOBILE DEVICE

CLAIM OF PRIORITY

This application is also a continuation-in-part of and claims priority to patent application Ser. No. 12/422,313 filed on Apr. 13, 2009, which claims priority from provisional application 61,161,763 filed on Mar. 19, 2009. Patent application Ser. No. 12/422,313 is a continuation-in-part of Ser. No. 11,519,600 filed Sep. 11, 2006, which was patented as U.S. Pat. No. 7,551,935. U.S. Pat. No. 7,551,935 is a continuation-in-part of Ser. No. 11/231,575 filed Sep. 21, 2005, which was patented as U.S. Pat. No. 7,580,719.

FIELD OF TECHNOLOGY

This disclosure relates generally to a communication system, and, more particularly, to a system, a method and an article of manufacture for optimization of context-data acquisition by a mobile device.

BACKGROUND

Short Message Service (SMS) messaging is a form of communication supported by most mobile telephone service providers and widely available on various networks including Global System for Mobile Communications (GSM), Code Division Multiple Access (CDMA), Time Division Multiple Access (TDMA), third generation (3G) networks, and fourth generation (4G) networks. Versions of SMS messaging are described in GSM specifications such as GSM specification 03.40 "Digital cellular telecommunications system (Phase 2+); Technical realization of the Short Message Service" and GSM specification 03.38 "Digital cellular telecommunications system (Phase 2+); Alphabets and language-specific information."

In general, SMS messages from a sender terminal are transmitted to a Short Message Service Center (SMSC), which provides a store-and-forward mechanism for delivering the SMS message to one or more recipient terminals. Successful SMS message arrival may be announced by a vibration and/or a visual indication at the recipient terminal. In some cases, the SMS message may typically contain an SMS header including the message source (e.g., telephone number, message center, or e-mail address) and a payload containing the text portion of the message. Generally, the payload of each SMS message is limited by the supporting network infrastructure and communication protocol to no more than 140 bytes which translates to 160 7-bit characters based on a default 128-character set defined in GSM specification 03.38, 140 8-bit characters, or 70 16-bit characters for languages such as Arabic, Chinese, Japanese, Korean, and other double-byte languages.

Due to payload limitations, a long message having more than 140 bytes or 160 7-bit characters may be delivered as separate SMS messages. In some cases, the SMS infrastructure may support concatenation allowing a long message to be sent and received as multiple concatenated SMS messages. In such cases, the payload of each concatenated SMS message is limited to 140 bytes but also includes a user data header (UDH) prior to the text portion of the message. The UDH contains segmentation information for allowing the recipient terminal to reassemble the multiple concatenated SMS messages into a single long message. In addition to alphanumeric characters, the text content of an SMS message may contain iconic characters (e.g. smiley characters) made up of a combination of standard punctuation marks such as a colon, dash, and open bracket for a smile.

Enhanced Messaging Service (EMS) is an application level extension to SMS described in the 3rd Generation Partnership Project (3GPP) Technical Specification (TS) 23.040 V6.7.0 (2006-03), "Technical realization of the Short Message Service." EMS extends the use of the UDH to include binary data which allows EMS-enabled terminals to send and receive text messages having simple media content such as text formatting, predefined icons, pictures, and sounds. EMS messaging is supported by the SMS infrastructure and constrained by SMS payload limits. As such, several concatenated short messages are typically required for EMS messaging since usually only one picture or sound can be sent in a single short message. If an EMS message is received by a non-enabled terminal, unreadable data will be overwritten and the message will be displayed as a normal SMS message.

Multimedia Messaging (MMS) technology provides capabilities beyond those of SMS and allows terminals to send and receive multimedia messages including graphics, video and audio clips. Unlike SMS, which depends primarily on the underlying wireless network technology (e.g. GSM, CDMA, TDMA), MMS relies on Internet Protocol (IP) technology and is designed to work with mobile packet data services such as General Packet Radio Service (GPRS) and Evolution Data Only/Evolution Data Optimized (EV-DO).

A mobile device may include a short messaging application such as SMS, EMS, MMS and the like. A user may compose and send short messages with the short messaging application. Portions of the short messages may be related to a mobile device's context such as its physical environment. Knowledge of this context may be useful to a receiver when reviewing the short message. For example, without the context data, the receiver may not understand ambiguities in the short message. The receiver may need to query the sending user with additional questions (e.g. other text messages, cell phone calls, etc.) to clarify the meaning of the short message.

Accordingly, there may be a need to enrich the short message with context data. Context data may be derived from sensors in the mobile device. Additionally, the mobile device may communicate with remote sensors in the mobile device's environment. Sensor quality and speed can vary. Some sensors may use more resources of the mobile device such as processing and battery power. Furthermore, some sensor data may be more relevant to a particular short message. Accordingly, there may be a need optimize context data acquisition techniques for enriching a short message with context data.

SUMMARY

A system, method, and article of manufacture for optimization of context-data acquisition by a mobile device are disclosed. In one aspect, a term of a short message generated with a mobile device is identified. A list is populated with at least one sensor of the mobile device. The list is sorted according to a specified metric. A physical quantity of an environmental attribute of the mobile device is measured with a first listed sensor: The measurement is converted into a context data.

In another aspect, a term of a short message generated with a mobile device is selected. A list is populated with at least one sensor of the mobile device. The list is populated according to a specified metric. A physical quantity of a mobile device's environmental attribute is measured with a first listed sensor. The measurement is converted into a context data.

In yet another aspect, a system that includes a text-messaging component is operative to generate, send and receive a text message. A text-message enriching component is operative to associate a sensor data with a text data. A sensor manager component is operative to select a sensor component according to a selection metric. A sensor component is operative to acquire the context data.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a system, method, and article of manufacture for optimization of context-data acquisition by a mobile device. Although the present embodiments have been described with reference to specific example embodiments, it will be evident that various modifications and changes can be made to these embodiments without departing from the broader spirit and scope of the various claims.

Figure 1:
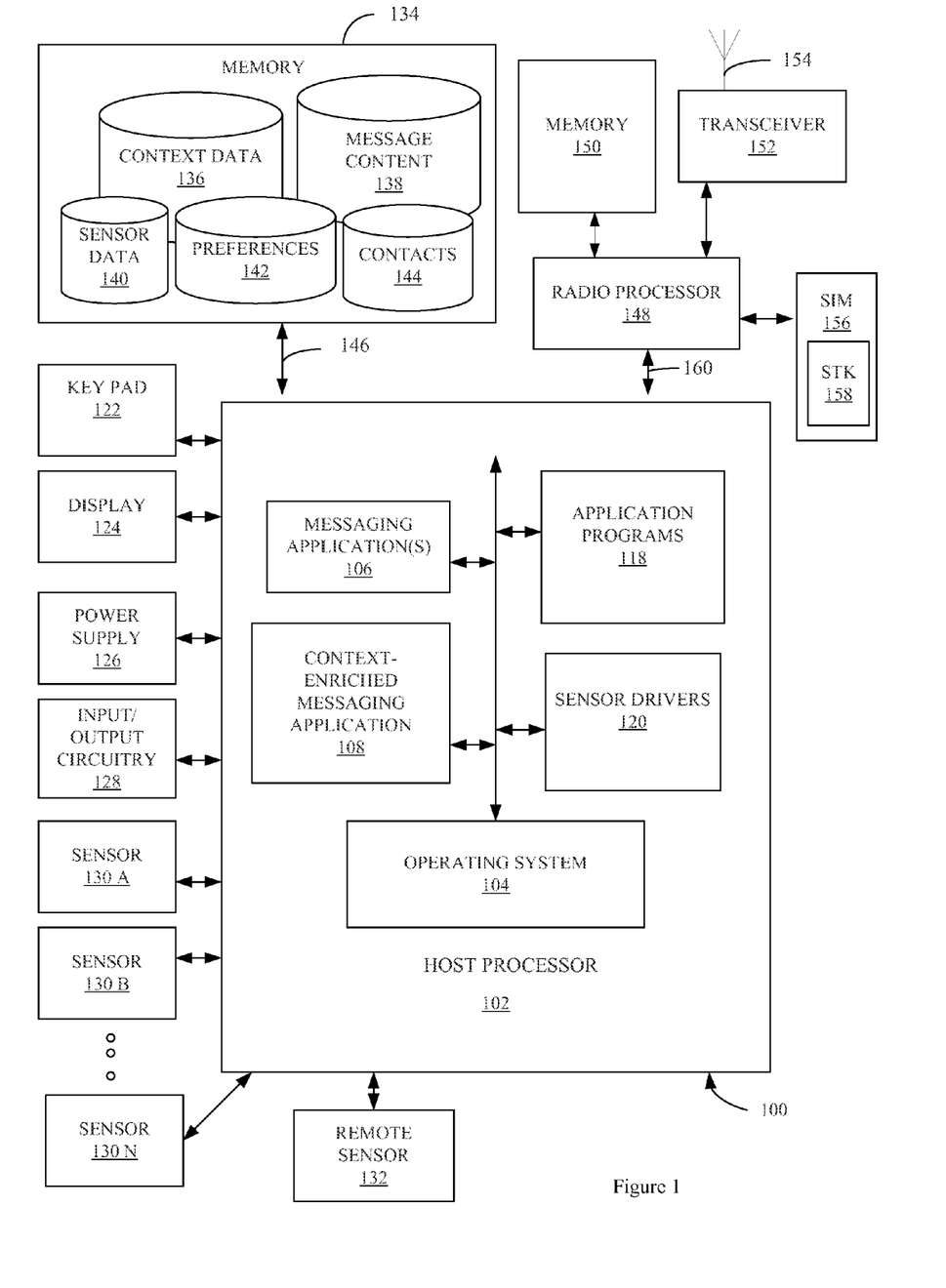
FIG. 1 illustrates a mobile device in accordance with one or more embodiments.

FIG. 1 illustrates a mobile device 100 in accordance with one or more embodiments. In some embodiments, mobile device 100 may be implemented as a combination handheld computer and mobile telephone, sometimes referred to as a smart phone. Mobile device 100 may provide voice and/or data communications functionality in accordance with different types of cellular radiotelephone systems. Examples of cellular radiotelephone systems may include CDMA systems, GSM systems, North American Digital Cellular (NADC) systems, TDMA systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, mobile device 100 may be arranged to provide mobile packet data communications functionality in accordance with different types of cellular radiotelephone systems. Examples of cellular radiotelephone systems offering mobile packet data communications services may include GSM with GPRS systems (GSM/GPRS), CDMA/1xRTT systems, Enhanced Data Rates for Global Evolution (EDGE) systems, EV-DO systems, Evolution For Data and Voice (EV-DV) systems, High Speed Downlink Packet Access (HSDPA) systems, High Speed Uplink Packet Access (HSUP A), and so forth.

Mobile device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Mobile device 100 may be arranged to perform data communications in accordance with different types of shorter-range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2,v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radiofrequency identification (RFID) protocols and devices.

As shown in the embodiment of FIG. 1, mobile device 100 can include a dual processor architecture including a host processor 102 and a radio processor 148. In some embodiments, host processor 102 and the radio processor 148 can be arranged to communicate with each other using interfaces such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Host processor 102 can be responsible for executing various software programs such as system programs and applications programs to provide computing and processing operations for the mobile device 100. Radio processor 148 can be responsible for performing various voice and data communications operations for mobile device 100 such as transmitting and receiving voice and data information over one or more wireless communications channels. Although some embodiments can be described as comprising a dual processor architecture for purposes of illustration, it is worthy to note that mobile device 100 can include any suitable processor architecture and/or any suitable number of processors in accordance with the described embodiments.

Host processor 102 can be implemented as a host central processing unit (CPU) using any suitable processor or logic device, such as a as a general purpose processor. Although some embodiments can be described with host processor 102 implemented as a CPU or general purpose processor by way of example, it can be appreciated that the embodiments are not limited in this context. For example, host processor 102 can include, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments. Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

Host processor 102 can be arranged to provide processing or computing resources to the mobile device 100. For example, host processor 102 can be responsible for executing various software programs including system programs such as operating system (OS) 104, context-enriched messaging application 108, application programs 118 and sensor drivers 120. System programs generally can assist in the running of the mobile device 100 and can be directly responsible for controlling, integrating, and managing the individual hardware components of the computer system. In some embodiments, OS 104 can be implemented, for example, as an Apple iOS, Blackberry OS, Android OS, Symbian OS, Palm Web OS, Microsoft Windows Mobile, LiMo, MeeGo, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, Java OS, a Wireless Application Protocol (WAP) OS, or other suitable OS in accordance with the described embodiments. The mobile device 100 can include other system programs such as device drivers, programming tools, utility programs, software libraries, application-programming interfaces (APIs), and so forth.

Host processor 102 can include messaging application 106. Messaging application 106 can a variety of text messaging applications that communicate various types of short messages in a variety of formats. Each messaging application can be representative of a particular kind of transport, enabling handling of short messages of particular types and formats for the particular application. The messaging applications can include, for example, an IM application, an e-mail application, an SMS application, and an MMS application. It is to be understood that the embodiments are not limited in this regard and that the messaging applications can include any other type of messaging or communications application in accordance with the described embodiments. In some embodiments, messaging applications can include a utility for converting voice messages to text. In this way, a voice message can be rendered into a short message format by a utility of messaging application 106. Voice message data can be acquired from such applications as a telephone application such as a cellular telephone application, a Voice over Internet Protocol (VoIP) application, a Push-to-Talk (PTT) application, voicemail, and so forth.

Host processor 102 can include a context-enriched messaging application 108. Context-enriched messaging application 108 can be arranged to enrich short messages (e.g. SMS, EMS, MMS, application-generated messages and the like) generated with the mobile device 100. In some embodiments, the short messages can be enriched to include and/or refer to context data that provides information about the physical environment of mobile device 100. Example reference devices include, inter alia, a hyperlink to a web document that includes the context data and/or an embedded URL to trigger the receiver's WAP browser to open and receive the context data from the embedded URL. Context-enriched messaging application 108 can communicate context-enriched messages, context data and/or short messages to a next appropriate entity according the various embodiments. For example, if the context-enriched message is an SMS message, context-enriched messaging application 108 can forward the context-enriched SMS message to an SMSC or VAS server, or similar entity of a cellular network. In another example, context-enriched messaging application 108 can forward the context-enriched message to a server (such as server 300 of FIG. 3 described infra) if the context-enriched message utilizes an IP-based means of delivery (such as the Internet). Context-enriched messaging application 108 can be arranged to determine an appropriate context data to associate with the short message such as according to any of the various metrics discussed herein. Context-enriched messaging application 108 can also be arranged to manage the sensors 130 A-N and 132 according to the various system attributes of the mobile device such as power availability, sensor power use, mobile device context, sensor availability and the like. In some embodiments, sensor availability can include a granular resolution of different states of availability such as mode operation (e.g. awake, asleep), integration into mobile device (e.g. remote sensor, add-on sensor, and/or integrated sensor), attributes of the type of coupling between mobile device and sensor (e.g. Bluetooth™ protocol, communication via a LAN, WAN and/or PAN), and/or any combination thereof. Context-enriched messaging application 108 can choose which context data to associate with a term according to a metric or set of metrics such as, for example, sensor power use, power availability (e.g. remaining battery power, wireless energy transfer service availability), current sensor signal magnitude, relevancy of context-data type to a meaning of a text-message component, known preferences of a receiving device, text-message network restrictions, mobile device security settings, data storage capacity of mobile device 100, sensor attributes (such as accuracy and/or sensitivity) and/or any combination thereof. In one example embodiment, a word, phrase or word structure pattern of the short message can be pre-associated with a set of sensors. The set of sensors can be listed according to how each currently rates according a given set of metrics. The top-listed sensor can then be chosen to provide the context data to be associated with the word, phrase or word structure pattern. In some embodiments, context-enriched messaging application 108 can format context-enriched messages according to a metric such as networking signaling strength and data packet size. For example, a local Wi-Fi signal may have a weaker magnitude than a local cellular network signal. In such a case, context-enriched messaging application 108 can format the context-enriched message in a format for delivery over the cellular network. However, if the context data requires a larger payload than is available in the cellular network messaging protocol (e.g. SMS), then context-enriched messaging application 108 can format context-enriched message in an IP-protocol messaging format.

Application programs 118 generally can allow a user to accomplish one or more specific tasks. In various implementations, the application programs 118 can provide one or more graphical user interfaces (GUIs) to communicate information between the mobile device 100 and a user. In some embodiments, application programs 118 can include upper layer programs running on top of the OS 104 of host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication. Examples of application programs 118 can include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. It is also to be appreciated that the mobile device 100 can implement other types of applications in accordance with the described embodiments.

Sensor drivers 120 can be arranged to allow other programs such as OS 104, application programs 118, Context-enriched messaging application 108 and the like, to interact with sensors coupled with host processor 102. Sensor drivers 120 can be specific to a sensor-type. Sensor drivers 120 can typically communicate with a sensor through a computer bus and/or communications subsystem to which the sensor connects. In some embodiments, sensor drivers 120 can communicate with one or more remote sensors 132 via a wireless interface, LAN and/or the Internet.

Mobile device 100 can include an alphanumeric keypad 122 coupled to the host processor 102. Keypad 122 can include, for example, a QWERTY key layout and an integrated number dial pad. Mobile device 100 can include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. In some embodiments, keypad 122 can be virtualized and rendered on touchscreen by a graphical user interface (GUI) utility.

Mobile device 100 can include a display 124 coupled to the host processor 102. The display 124 can include any suitable visual interface for displaying content to a user of the mobile device 100. In one embodiment, for example, the display 124 can be implemented by a liquid crystal display (LCD) such as a touch-sensitive color (e.g., 16-bit color) thin-film transistor (TFT) LCD screen. In some embodiments, the touch-sensitive LCD can be used with a stylus and/or a handwriting recognizer program.

Host processor 102 can be coupled to a power supply 126 arranged to supply and manage power to the elements of mobile device 100. In some embodiments, the power supply 126 can be implemented by a rechargeable battery, such as a removable and rechargeable lithium ion battery to provide direct current (DC) power, and/or an alternating current (AC) adapter to draw power from a standard AC main power supply.

Host processor 102 can be coupled to sensors 130 A-N and/or remote sensor 132. A sensor can be arranged to translate a physical characteristic of the environment of the mobile device 100 into a computer-processor readable format. Example sensors include, inter alia, global positioning system systems, accelerometers, inclinometers, position sensors (compass, magnetometer), barometers, WiFi sensors, RFID sensors, near-filed communication (NFC) devices, gyroscopes, pressure sensors, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas, biometric sensors, capacitance probes and /or any combination thereof. It should be noted that the other sensor devices other than those listed can also be utilized to 'sense' context data.

Mobile device 100 can be arranged to communicate with one or more remote sensors 132. For example, a set of remote sensors 132 can be arranged as a wireless sensor network (WSN) and/or a virtual sensor network (VSN). For example, a WSN can be implemented as a network of distributed autonomous sensors that cooperatively monitor physical or environmental conditions, such as temperature, sound, vibration, pressure, motion or pollutants. In another example, a VSN can involve dynamically varying subset of remote sensors. In such a case, remote sensors can detect how a phenomenon changes with time as the phenomenon migrates. Sensor drivers 120 can differentiate between active and inactive sensors and interact with the active sensors to conserve the processing and power resources of mobile computing device 100.

Mobile device 100 can include an input/output (I/O) circuitry 128 coupled to the host processor 102. I/O circuitry 128 can include one or more I/O devices such as a serial connection port, an infrared port, integrated Bluetooth wireless capability, and/or an integrated 802.11x (WiFi) wireless capability, to enable wired (e.g., USB cable) and/or wireless connection to a local computer system, such as a local personal computer (PC). In various implementations, mobile device 100 can be arranged to transfer and/or synchronize information with the local computer system. Various audio/video (AV) devices that support AV capability of the mobile device 100 can also be included. Examples of AV devices can include, for example, a microphone, one or more speakers, an audio port to connect an audio headset, an audio coder/decoder (codec), an audio player, a MIDI device, a digital camera, a video camera, a video codec, a video player, and so forth.

As shown, host processor 102 can be coupled through memory bus 146 to a memory 134. Memory bus 146 can include any suitable interface and/or bus architecture for allowing host processor 102 to access memory 134. Although memory 134 can be shown as being separate from host processor 102 for purposes of illustration, it is worthy to note that in various embodiments some portion or the entire memory 134 can be included on the same integrated circuit as host processor 102. Alternatively, some portion or the entire memory 134 can be disposed on an integrated circuit or other medium (e.g., hard disk drive) external to the integrated circuit of host processor 102. In various embodiments, mobile device 100 can include an expansion slot to support a multimedia and/or memory card, for example.

Memory 134 can be implemented using any computer-readable media capable of storing data such as volatile or non-volatile memory, removable or nonremovable memory, erasable or non-erasable memory, writeable or re-writeable memory, and so forth. Examples of computer-readable storage media can include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

As mentioned above, radio processor 148 can perform voice and/or data communication operations for mobile device 100. For example, radio processor 148 can be arranged to communicate voice information and/or data information over one or more assigned frequency bands of a wireless communication channel. In various embodiments, radio processor 148 can be implemented as a communications processor using any suitable processor or logic device, such as a modem processor or baseband processor. Although some embodiments can be described with radio processor 148 implemented as a modem processor or baseband processor by way of example, it can be appreciated that the embodiments are not limited in this context. For example, radio processor 148 can include, or be implemented as, a digital signal processor (DSP), media access control (MAC) processor, or any other type of communications processor in accordance with the described embodiments.

In various embodiments, radio processor 148 can perform analog and/or digital baseband operations for mobile device 100. For example, radio processor 148 can perform digital-to-analog conversion (DAC), analog-to-digital conversion (ADC), modulation, demodulation, encoding, decoding, encryption, decryption, and so forth.

Mobile device 100 can include memory 134 coupled to radio processor 148. Memory 150 can be implemented using one or more types of computer-readable media capable of storing data such as volatile or non-volatile memory, removable or non-removable memory, erasable or non-erasable memory, writeable or re-writeable memory, and so forth. Memory 150 can include, for example, flash memory and secure digital (SD) RAM. Although the memory 150 can be shown as being separate from and external to radio processor 148 for purposes of illustration, it is worthy to note that in various embodiments some portion or the entire memory 150 can be included on the same integrated circuit as radio processor 148.

Mobile device 100 can include a transceiver module 152 coupled to radio processor 148. Transceiver module 152 can include one or more transceivers arranged to communicate using different types of protocols, communication ranges, operating power requirements, FRO sub-bands, information types (e.g., voice or data), use scenarios, applications, and so forth. In various embodiments, transceiver module 152 can include one or more transceivers arranged to support voice communication for a cellular radiotelephone system such as a GSM, UMTS, and/or CDMA system. Transceiver module 152 also can include one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc), PAN protocols, Infrared protocols, Bluetooth protocols, EMI protocols including passive or active RFID protocols, and so forth. In some embodiments, transceiver module 152 can include a Global Positioning System (GPS) transceiver to support position determination and/or location-based services. Transceiver module 152 generally can be implemented using one or more chips as desired for a given implementation. Although transceiver module 152 can be shown as being separate from and external to radio processor 148 for purposes of illustration, it is worthy to note that in various embodiments some portion or the entire transceiver module 152 can be included on the same integrated circuit as radio processor 148. The embodiments are not limited in this context.

Mobile device 100 can include antenna system 154 for transmitting and/or receiving electrical signals. As shown, antenna system 154 can be coupled to radio processor 148 through transceiver module 152. Antenna system 154 can include or be implemented as one or more internal antennas and/or external antennas.

Mobile device 100 can include a subscriber identity module (SIM) 156 coupled to the radio processor 148. SIM 156 can include, for example, a removable or non-removable smart card arranged to encrypt voice and data transmissions and to store user-specific data for allowing a voice or data communications network to identify and authenticate the user. SIM 156 also can store data such as personal settings specific to the user. In some embodiments, SIM 156 can be implemented as an UMTS universal SIM (USIM) card or a CDMA removable user identity module (RUIM) card. SIM 156 can include a SIM application toolkit (STK) 158 including a set of programmed commands for enabling the SIM 156 to perform various functions. In some cases, STK 158 can be arranged to enable SIM 156 to independently control various aspects of mobile device 100.

Figure 2:
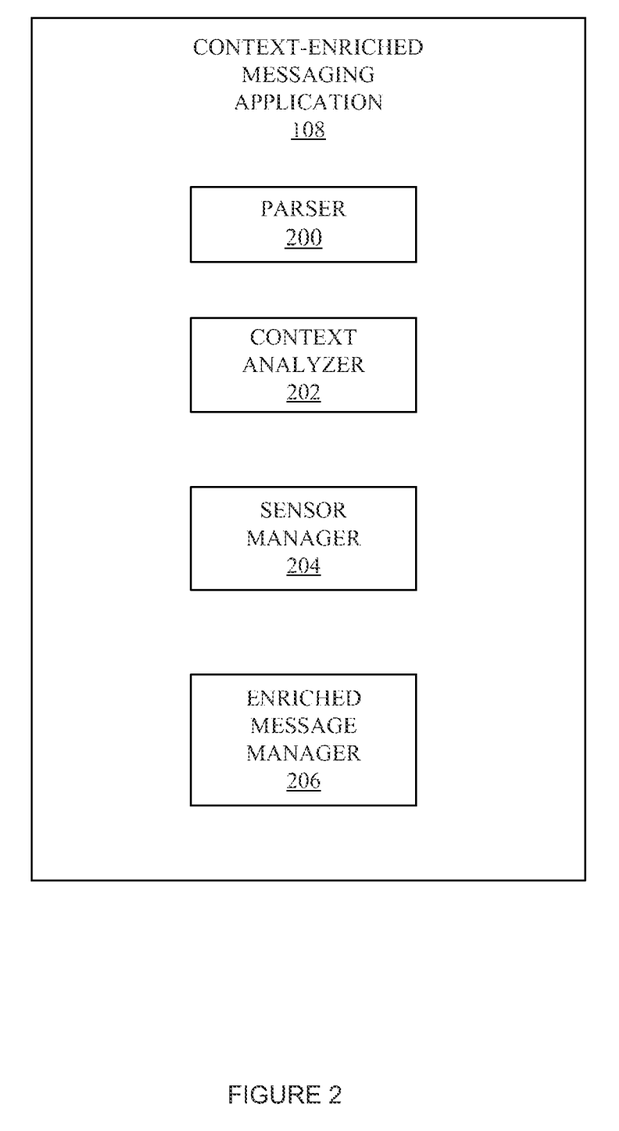
FIG. 2 illustrates an example context-enriched messaging application according one or more embodiments.

FIG. 2 illustrates an example context-enriched messaging application 108 according one or more embodiments. Context-enriched messaging application 108 can include parser 200. Parser 200 can be arranged to parse the text portion of the short message. Example parsing methodologies include top-down parsing (e.g. LL parser, recursive-descent parser) and/or bottom/up parsing (e.g. precedence parser, LR parser). Certain words and/or phrases may have been selected by a user.

Context-enriched messaging application 108 can include context analyzer 202. Context analyzer 202 can be arranged to determine an appropriate type or types of context data that it can associate with a particular term (or phrase) using such methodologies as semantic analysis, association algorithms, association tables, and the like. Context analyzer 202 can utilize one or more text analytic techniques to turn text into data for analysis via application of natural language processing (NLP) and other analytical methods. Text analytics can involve information retrieval, lexical analysis to study word frequency distributions, pattern recognition, tagging/annotation, information extraction, data mining techniques including link and association analysis, visualization, semantic analysis and predictive analytics. Context analyzer 202 can utilize one or more pattern recognition algorithms to determine the meaning of a word and/or phrase. Suitable types of pattern recognition algorithms can include neural networks, support vector machines, decision trees, K-nearest neighbor, Bayesian networks, Monte Carlo methods, bootstrapping methods, boosting methods, or any combination thereof.

Context analyzer 202 can then generate a list of available sensors that provide the relevant context data types. Context analyzer 202 can order the list of sensors according certain metrics. Example metrics include sensor power usage, signal availability, sensor availability, processor availability (e.g. CPU, GPU), power source level, relevance between sensor's context data and associated term, user settings, and so forth. Context analyzer 202 can then acquire context data from the first listed sensor. Context analyzer 202 can acquire context data from such sources as the sensor manager 204, a database of recent context data 136, operating system 104, and memory 150. Context analyzer 202 can generate a list of possible context data sources (e.g. sensors). The list can then be prioritized according to one or more metrics such as recency of context data acquisition by a sensor, quality of the context data, integrity of context data, type of message, size constraints of the messaging protocol and/or availability of context data, for example. For example, if the short message is an SMS message, context analyzer 202 may prioritize a context data type that can be expressed within the 140 octet size constraint (e.g. GPS coordinates as text, temperature as text). In one example, context analyzer 202 can use a ranking algorithm to perform a multi-dimensional fit across a broad set of parameters. This parameter can include any metric including those listed herein.

Another example metric can include security levels associated with the various sensors. For example, a particular sensor may be more susceptible in a particular location. In some embodiments, sensors with lower security levels can be weighted lower (e.g. allocated a lower metric value) on the list of context data sources generated by the context analyzer 202. For example, if the location has been associated with a security concern, a camera/image recognition application that is native to mobile device 100 (such as Google Goggles™) can receive a more favorable metric value than a non-native sensor that transmits information via a radio signal (e.g. Bluetooth™ or NFC). The embodiments are not limited in this context. In some embodiments, the security level metric can be user-defined.

Another example metric can include the cost of a transmission service that may be used to communicate the context-enriched message. A transmission service with a lower cost to access and/or use can be allocated a higher metric value than another transmission service with a greater cost. Another example metric can include sensor specific metrics such as sensor sensitivity and the like. A sensor with a greater sensor sensitivity can be allocated a greater metric value than another sensor with a lesser sensor sensitivity.

In another example, a user may be at a restaurant in a densely-packed downtown area and sends a short message: "Meet me here". In this example, accuracy of the location can be important. The type of GPS sensor included in the mobile device may have a known inaccuracy range of between forty and one-hundred meters. As such, the GPS data may not have the accuracy and precision to warrant a high placement in the queue. The mobile device may also be able to sense a Wi-Fi signal of the particular location. Context analyzer 202 may then chose to utilize known WiFi identification data to generate the location data that is included in the context-enriched message. The embodiments are not limited in this context.

Context-enriched messaging application 108 can include sensor manager 204. Sensor manager 204 can be arranged to manage sensor driver(s) 120 to control the operation of the sensors 130 A-N and 132. Sensor manager 204 can modulate power allocation to sensors 130 A-N. Sensor manager 204 can also provide sensor metrics (e.g. signal reception quality, sensor availability and the like) to context analyzer 202. If more than one utility is using a sensor, sensor manager 204 can modulate utility sensor usage. For example, sensor manager 204 can prioritize sensor usage for acquisition of context data for the context analyzer 202 over an operation of another utility or application. Sensor manager 204 can provide a register of stored context-data and metadata about the context-data (e.g. time stamp data, location of acquisition and the like). Sensor manager 204 can acquire certain pre-defined types of context data on a periodic basis and store the context data in context-data memory store 136. This historical context data can itself be relevant context data to be associated with a term or phrase of the short message (e.g. mapping a route of travel for a period of time). Additionally, in some cases, historical context data can be used in the event current context data is not available. It should also be noted that more than one type of context data can be associated with a term.

Context-enriched messaging application 108 can include enriched message manager 206. Enriched message manager 206 can be arranged to generate a context-enriched message that associates the term of the short message with the context data. Enriched message manager 206 can format the context-enriched message according to the type of messaging application that generated the short message. For example, if the short message is an SMS message, enriched message manager 206 can generate a form of context-enriched SMS message such as a concatenated-SMS message. In another example, message manager 206 can convert context data into text and include the short message and context-data text. For example, an SMS message text can be "We are here, it is cold". The context data includes the identity of 'We' (e.g. identified from the control signals of nearby smart phones), the definition of 'here' (e.g. derived from GPS data and/or other geolocation algorithm) and the definition of 'cold' (e.g. as measured by a temperature sensor onboard the mobile device and processed according to pre-determined rules). Enriched message manager 206 converts the associated context data into text. Thus, in this particular example, the context data can be translated using the following example format: 'We'=(Tom, Jerry), 'here'=(14 Oak Lane, Bellview, Tex., USA), 'cold'=(36 F). The text of the generated context enriched SMS message can then become: "We are here, it is cold—We=(Tom, Jerry), here=(14 Oak Lane, Bellview, Tex., USA), cold=(36 F)". In another example, enriched message manager 206 can modify the text of an SMS message to include markup language annotations of the short message text and the context data text. The embodiments are not limited in this context.

Alternatively, in another example format, certain portions of the context data can be truncated to provide for message size constraints. In other examples, messaging protocols with larger message-size parameters than SMS can present context data in richer media formats such as webpage mashups, third-party mapping services, media content, hypertext, social networking page elements and the like. The embodiments are not limited in this context. Enriched message manager 206 can also be arranged to receive and display a short message and context data.

Context-data can be embedded in a short message as metadata. Metadata of context data can be used by a messaging service provider for various operations such as marketing, message presentation (e.g. annotations with a markup language), user analytics and/or social-network graph analytics. Metadata of context data can be used by a receiving mobile device application to present the short message and the associated context data. The embodiments are not limited in this context.

Figure 3:
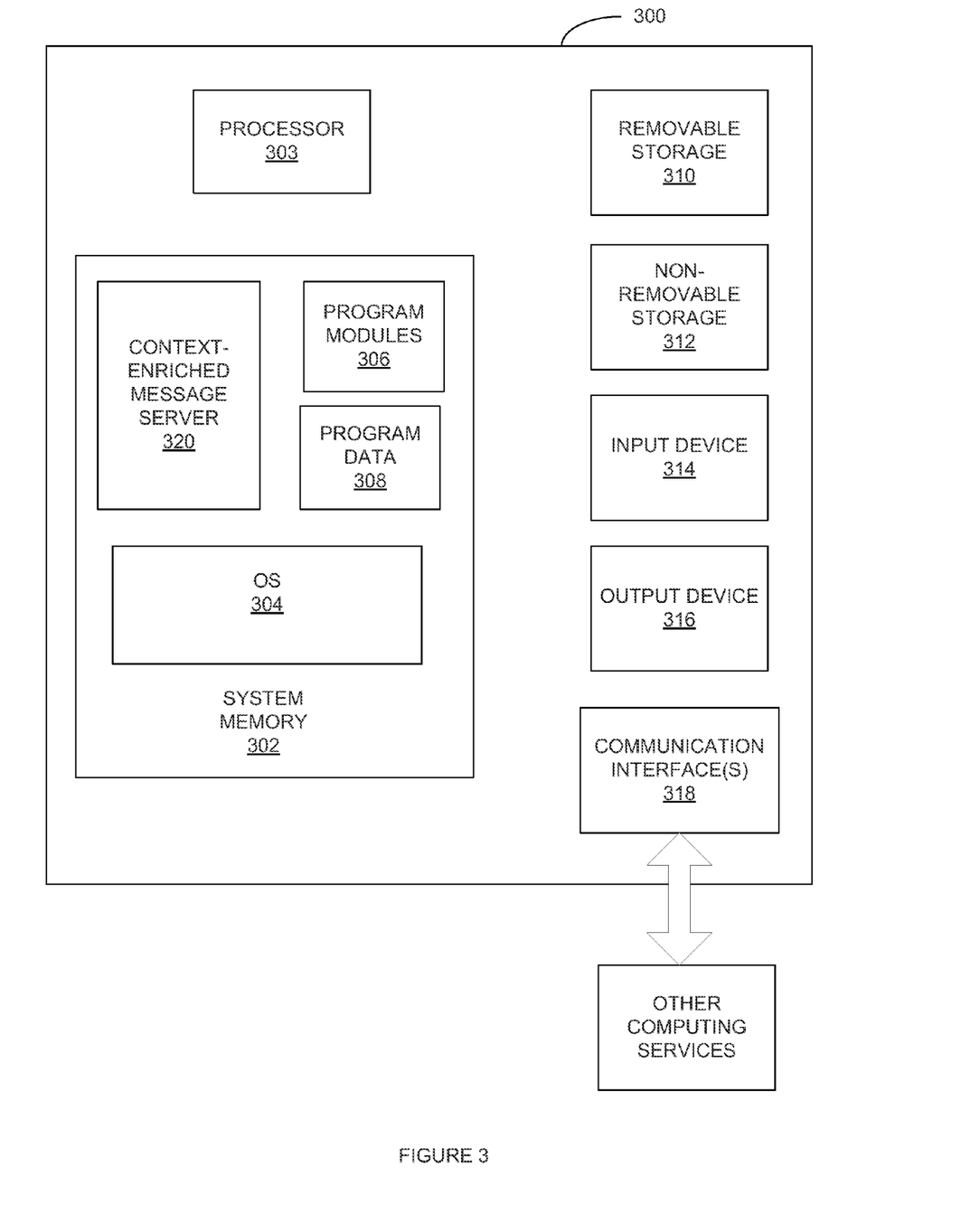
FIG. 3 shows a block diagram of a computer operable to execute the disclosed architecture of a communications server, according to one or more embodiments.

FIG. 3 shows a block diagram of a computer operable to execute the disclosed architecture of a communications server 300, according to some embodiments. In a basic configuration, communication server 300 typically includes at least one processing unit 303 and system memory 302. Depending on the exact configuration and type of computing device, system memory 302 can be volatile (such as RAM), non-volatile (such as ROM, flash memory, etc.) or some combination of the two. The system memory 302 generally includes an operating system 304, one or more program modules 306, other program data 308, and context-enriched message server 320. In some embodiments, system memory 302 can also include several of the functionalities of the mobile device 100 as program modules. Thus, communication server 300 can provide a resource to scale the processing power and battery resources of mobile device 100. Additionally, the communication server 300 can utilize a separate context-data store. In some embodiments, a separate context-data store can also be utilized to scale the data storage resources of mobile devices 100. Communication server 300 can include a dedicated search engine (not shown). The search engine can be set to search a particular set of databases and/or files for additional information relevant to the short message and/or context data of a context-enriched message. The additional information can be included in a context-enriched message to enrich the context-enriched message.

In some embodiments, the communication server 300 can include a context-enriched message server 320. Context-enriched message server 320 can perform the same functions as context-enriched messaging application 108 as adapted to the context of communication server 300. In some embodiments, context-enriched messaging application 108 can assign certain functions to context-enriched message server 320 in order to conserve the memory and/or processing resources of mobile device 100. In some embodiments, context-enriched message server 320 can acquire context data by querying a mobile device. Context-enriched message server 320 can store context data in a data store and generate a register of available context data. Context-enriched message server 320 can interact with a third-party system via an applied program interface (API), to acquire additional information about context data. For example, context-enriched message server 320 can acquire a map from a third-party mapping service hosted on third-party server. Context-enriched message server 320 can generate digital media content that includes text, graphics, audio, video, animation files, context data and/or any combination thereof. Text, graphics, audio, video, animation files can be obtained from third-party sources and/or pre-stored for in a system data store communicatively coupled with communication server 300. The embodiments are not limited in this context.

Context-enriched message server 320 can translate one message format into another message format. For example, if context-enriched message server 320 is a value-added service provider (VASP) server (e.g. an External Short Messaging Entity (ESME)), context-enriched message server 320 can be arranged to translate an incoming context-enriched IP-protocol based message into an SMS message that includes the context data in an appropriate format (e.g. truncated and/or translated into text). In another example, context-enriched message server 320 can be arranged to translate an incoming context-enriched an incoming context-enriched SMS message into a context-enriched annotated microblog post. The embodiments are not limited in this context.

Communication server 300 can include additional features or functionalities. For example, the communication server 300 can also include additional data storage devices (removable and/or non-removable) such as, magnetic disks, optical disks, or tape. Such additional storage is illustrated in FIG. 3 by removable storage 310 and non-removable storage 312. Example, computer storage media can include volatile and nonvolatile, removable and non-removable media implemented in any method or technology for storage of information, such as computer readable instructions, data structures, program modules, or other data. The system memory 302, removable storage 310 and non-removable storage 312 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, firmware, magnetic disk storage or other magnetic storage devices, or any other medium which storage media can be part of the communication server 300. These computer storage media can include computer-executable instructions for implementing the various embodiments described herein. The communication server 300 can also have input device(s) 314 such as a keyboard, a mouse, a pen, a voice input device, a gesture-based interface and/or a touch-sensitive input device. Output device(s) 316 such as a display, speakers, printer, etc. can also be included.

The communication server 300 can also include communication interfaces 318 that allow the device to communicate with other computing devices over a communication network. For example, communication interfaces can include cellular-network communication interface and/or an IP-network interface. Communication interfaces 318 are one example of communication media. Communication media can be embodied by computer readable instructions, data structures, program modules, or other data in a modulated data signal, such as a carrier wave or other transport mechanism, and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. The computer readable media as used herein can include both storage media and communication media according to various example embodiments.

Figure 4:
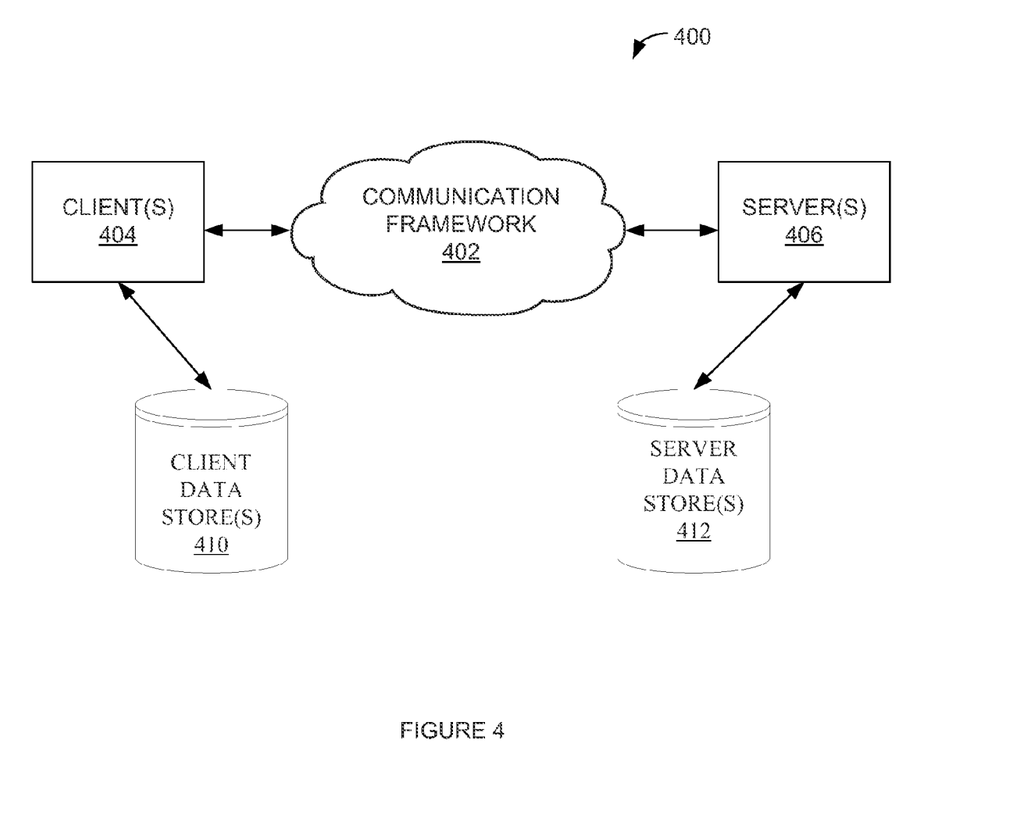
FIG. 4 illustrates a block diagram of an exemplary client-server computing environment in accordance with one or more embodiments.

FIG. 4 illustrates a block diagram of an exemplary client-server computing environment 400 in accordance with some embodiments. The system 400 includes one or more clients 404. client 404 can be hardware circuitry and/or software applications (e.g., threads, processes, computing devices), that communicate with server 406 according to the client-server communication paradigm. Client 404 can be equipped with conventional mechanisms to receive and send information through the communication framework 402, such as ports, network cards, receivers, modems, and so on. In some embodiments, client 404 can be implemented in a number of ways such as context-enriched messaging application 108, a web browser, an MMS application, an SMS application and the like. For example, client 404 can receive context-enriched messages, short messages and/or context data from server 406. In some embodiments, client 404 can query server 406 for additional information and/or to request that a context-enriched message be resent in another format.

System 400 also includes one or more servers 406. In some embodiments, server 406 can also be hardware circuitry and/or software applications (e.g., threads, processes, computing devices). Server 406 can house threads to perform the methods and operations described herein. One possible communication between a client 404 and a server 406 can be in the form of a data packet adapted to be transmitted between two or more computer processes. The data packet can include a text of a short message, media of a short message and/or associated contextual information, for example.

Server 406 can be implemented in a number of ways, such as communications server 300 of FIG. 3, a host server of a Website, a smart-phone application server, a telecommunications server, an MMS VAS server, an SMS VAS server and so forth, according to the various embodiments. Server 406 can organize and format a context-enriched message, short message, and context data sent to client 406 in a wide variety of manners depending of the server-type and communications protocol used. Server 406 can reformat a context-enriched message into a configuration appropriate for client 404. For example, a context-enriched concatenated SMS message generated by a sending device can be reconfigured by server 406 as a context-enriched annotated microblog post (such as a Twitter® annotated microblog post). In some embodiments where server 406 is a value-added service provider (VASP) server, server 406 can communicate with peer entities (e.g. an SMSC) with a telecommunications protocol such as the Short Message Peer-to-Peer (SMPP) protocol. The embodiments are not limited in this context.

System 400 can include a communication framework 402 (e.g., the various communication systems described supra in the description of FIG. 1, the Internet, other mobile telephony systems) that can be employed to facilitate communications between the client 404 and the server 406. Communications can be facilitated via a wired (including optical fiber) and/or wireless technology (e.g. including an 802.11 network). Client 404 can be communicatively coupled to one or more client data stores 410 that can be employed to store information local to the client 404 (e.g., cookie(s), user contacts, historical short messages and/or associated contextual information). Similarly, the server 406 can be operatively coupled to one or more server data stores 412 that can be employed to store information local to the server 406. It should be noted, that in some embodiments, a particular application can function as a client in one context or operation and as a server in another context or operation.

In some embodiments, system 400 can also be modulated to implement a client-server communication paradigm in a web-based context, and client 404 can reside on a third-party server such as a third-party website server. In another example, client 404 can be arranged to receive short messages and/or associated context-data and include the information in a webpage document. For example, context-enriched message server 320 can be arranged to receive a context-enriched message from another application such as the context-enriched messaging application 108. Server 320 can annotate the short message with a markup language (e.g. HTML, XML, a proprietary markup language and so forth). The annotations can represent structured metadata about the short message and/or the context data. The short message, context data and annotations can then be communicated to the website server.

It should be noted that in some embodiments, enriched message manager 206 of context-enriched messaging application 108 can be arranged to annotate the short message. For example, enriched message manager 206 may annotate the short message with a proprietary markup language to include and/or associate the context data with certain terms. The resulting context-enriched message can then be communicated to context-enriched message server 320. Context-enriched message server 320 can then forward the context-enriched message to the destination application. If applicable, context-enriched message server 320 can also translate the annotations into an appropriate markup language readable by the destination application.

In some embodiments, system 400 can be modulated to implement a client-server communication paradigm for several types of short message protocols. For example, in some embodiments, client 404 can be arranged to create a context-enriched MMS message (e.g. with an MMSCOMP utility). The MMSCOMP utility can accept an input a file that includes text representations of an MMS header, and one or more files (image, sound, text, context data, etc.) to comprise the multipart message content. The MMS message can be formatted based, in part, upon an MMS Encapsulation Protocol Specification. Server 406 can then reside in a MMSC Messaging Server arranged to store and deliver the context-enriched MMS message. Client 404 can interface with server 406 through an interface such as an MM7 interface. It may be appreciated that the embodiments are not limited in this context.

Figure 5:
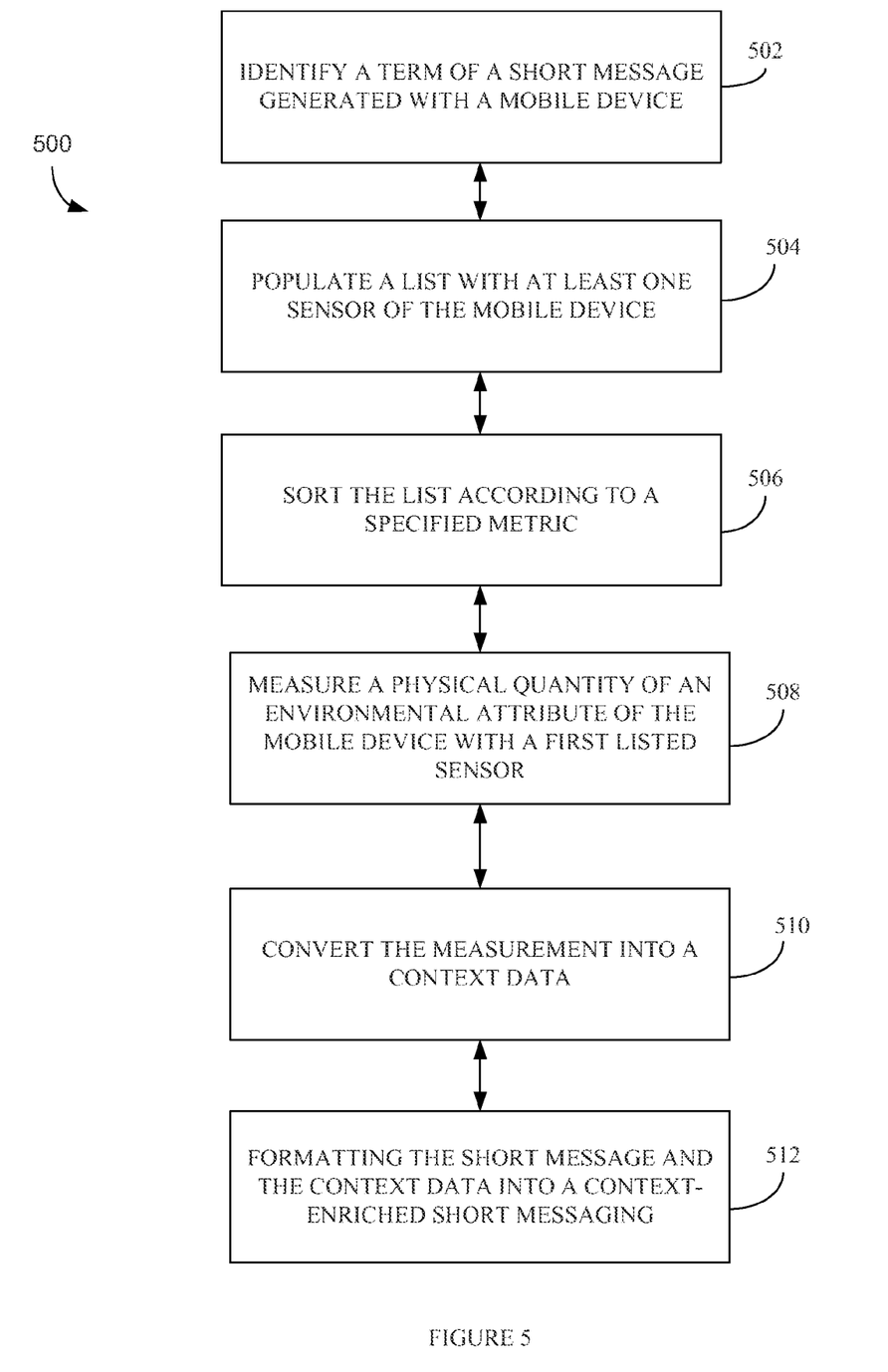
FIG. 5 illustrates a context-enriched message logic flow in accordance with one or more embodiments.

FIG. 5 illustrates a context-enriched message logic flow 500 in accordance with one or more embodiments. The logic flow 500 may be performed by various systems and/or devices and may be implemented as hardware, software, and/or any combination thereof, as desired for a given set of design parameters or performance constraints. For example, the logic flow 500 may be implemented by a logic device (e.g., processor) and/or logic comprising instructions, data, and/or code to be executed by a logic device. For purposes of illustration, and not limitation, the logic flow 500 is described with reference to FIG. 1 and FIG. 2. The embodiments are not limited in this context.

In block 502, a term of a short message generated with a mobile device is identified. For example, in one embodiment, the short message can be parsed. A list of terms to associate with context data can be compared with a list of terms of the short message. A term common to both lists can then be identified. In another embodiment, the term can be selected by a user. In yet other embodiments, other methodologies to identify a term can be utilized. In block 504, a list is populated with at least one mobile device sensor. In some embodiments, the list can include remote sensors as well. In block 506, the list is sorted according to a specified metric. For example, each listed sensor can be ranked according the magnitude of its metric value. In some embodiments, a combination of metric values can be used to sort the list. In block 508, a physical quantity of an environmental attribute is measured by the first listed sensor of the list. In block 510, the measurement is converted to context data. The context data can be in a machine-readable format. In block 512, the short message and the context data are formatted into a context-enriched short message. In some embodiments, the circuits, applications and utilities of FIG. 1 and FIG. 2 can be utilized to perform the operations of blocks 502-512.

Figure 6:
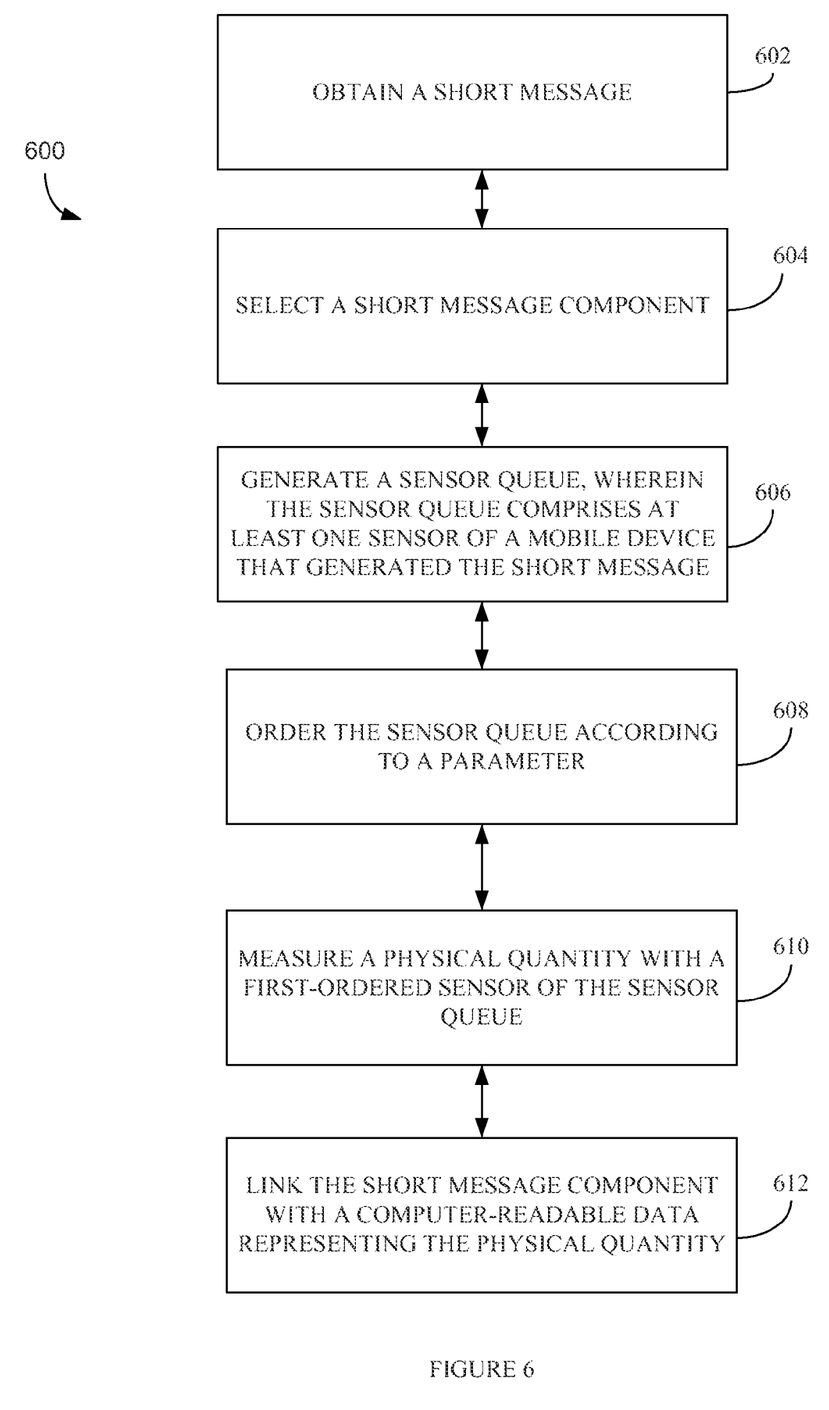
FIG. 6 illustrates a context-enriched message logic flow in accordance with one or more embodiments.

FIG. 6 illustrates a context-enriched message logic flow 600 in accordance with one or more embodiments. The logic flow 600 may be performed by various systems and/or devices and may be implemented as hardware, software, and/or any combination thereof, as desired for a given set of design parameters or performance constraints. For example, the logic flow 600 may be implemented by a logic device (e.g., processor) and/or logic comprising instructions, data, and/or code to be executed by a logic device. For purposes of illustration, and not limitation, the logic flow 600 is described with reference to FIG. 1 through FIG. 4. The embodiments are not limited in this context.

In block 602, a short message is obtained. In some embodiments, the short message can be obtained from a messaging application such as an SMS, EMS, MMS, ping-push messaging, IP-based messaging application. In block 604, a short message component can be selected. Example short-message component-selection criteria can include user actions, mobile device context and other selected criteria. In block 606, a sensor queue is generated. The sensor queue can include at least one mobile device sensor. The mobile device sensor can in the same mobile device that generated the short message. In some embodiments, the sensor can be a remote sensor such as a sensor in a WSN and/or a VSN. In block 608, the sensor queue is ordered according to a parameter. In block 610, a physical quantity is measured with the first-ordered sensor of the sensor queue. In some embodiments, the physical quantity can be an environmental attribute of the mobile device. The physical quantity can be rendered into computer-readable data. In block 612, the short message component is linked with the computer-readable data representing the physical quantity. Examples of linking include, inter alia, embedding the short message and the computer-read data in the same context-enriched message, providing instructions for a receiving device to display the short message and the computer-read data in a single and/or sequential message view, annotating the short message with a markup language that includes computer-read data, and the like.

Figure 7A:
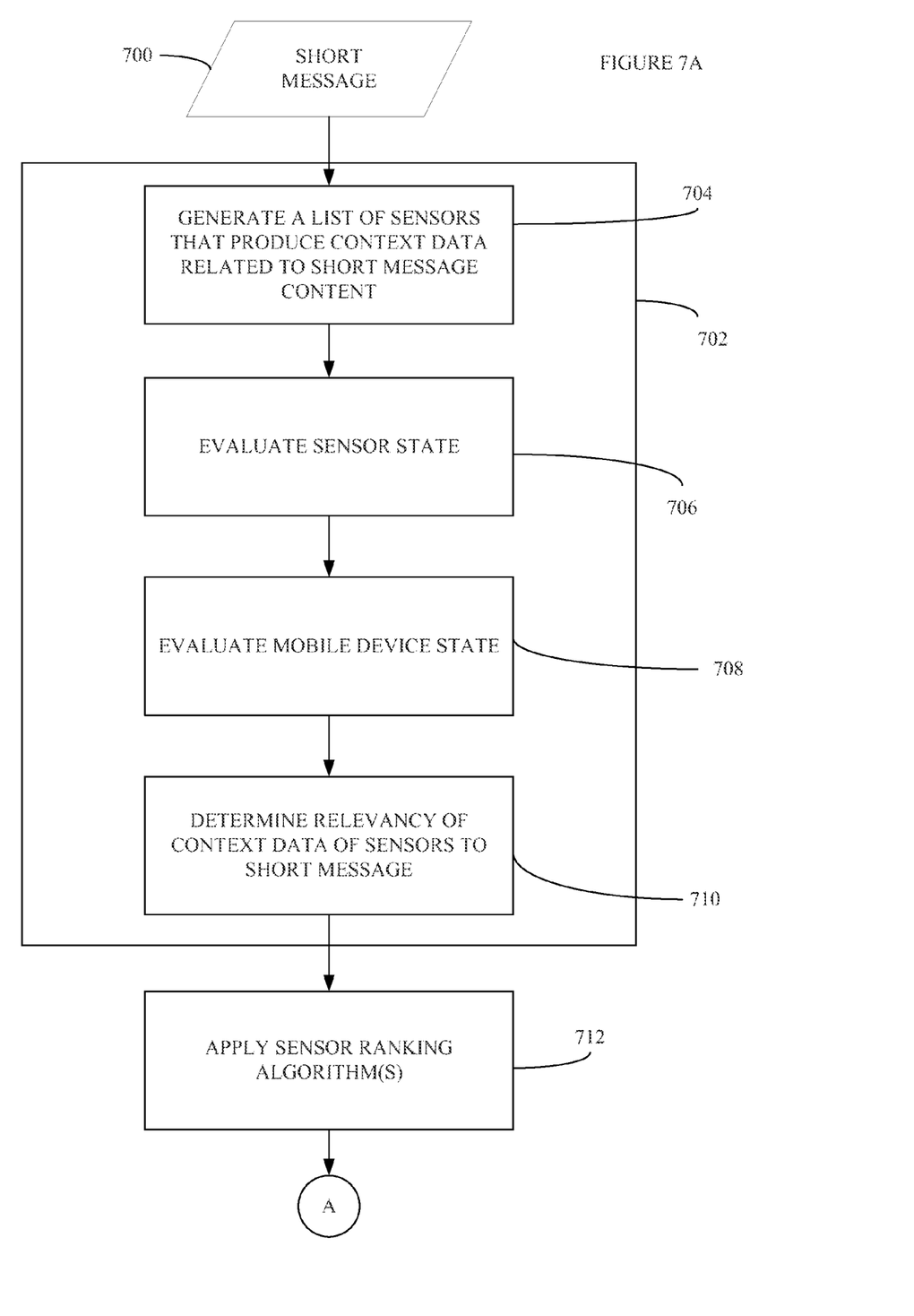
FIG. 7A illustrates a flowchart of an example method of acquisition of context data and generation of a context-enriched short message with a mobile device in accordance with one embodiment.

FIG. 7A illustrates a flowchart of an example method of acquisition of context data and generation of a context-enriched short message with a mobile device in accordance with one embodiment. Block 700 illustrates short message data generated by a message composer application of a mobile device. Block 702 represents a set of operations for generating a list of sensors available to the mobile device, such as in block 704. Block 702 further includes example operations for determining metric values to assign to various listed sensors according to certain parameters. For example, block 706 represents evaluating a sensor state. Example sensor states that can be evaluated include those listed supra, such as sensor availability, sensor sensitivity, and the like. Block 708 represents evaluating a mobile device state such as a power supply value of a battery, a context of the mobile device, available memory, available processing power and the like.

Block 710 represents determining a relevancy of the context data provided by a sensor with the short message (or a component of the short message). In some embodiments, a method that identifies seed terms in the short message can be used to generate a list of relevant context data sources (e.g. sensors). For example, seed terms can be correlated with a type of context data of the mobile device (e.g. 'here' correlated with GPS, assisted GPS (A-GPS), wi-fi signal source identity; 'cold' correlated with temperature—temperature can be acquired from a native sensor of the mobile device and/or from a web query after determining the location of the mobile device; 'we' and 'us' correlated with the control signal of nearby mobile devices, etc). In one example, a bibliogram can be generated of short message and/or with a set of short messages with a specified period. The bibliogram can be used to generate a list of short message terms to associate with context data. In another example, a content analysis utility can be used to generate the list of short message terms that are related to various available sensors. It can be appreciated that the embodiments are not limited in this context.

In the operations of blocks 706-710, values can be given to each sensor based on a magnitude of the condition evaluated. For example, a sensor functioning at near maximum sensitivity can receive a higher value than a sensor functioning at a lower sensitivity. Block 712 illustrates applying a ranking algorithm to the list of sensors and ranking the list according one or more metrics. For example, a sensor ranking utility can rank sensor according to such metrics as ranking sensors based on relevance to short message content, sensor power usage (e.g. if mobile device power supply is a concern) user settings, and the like.

In some embodiments, a ranking utility can use a ranking algorithm to put elements of a generated list in a certain order. Example ranking algorithms include, inter alia, bibliograms, modified search-engine ranking functions that estimate relevance, machine-learned ranking functions, and/or sorting algorithms such as a bubble sort, an insertion sort, a shell short, a merge short, a heap sort, a counting sort, a quick sort, a bucket sort, a radix sort, and/or a distribution sort. Various combinations of ranking algorithms and metrics can be used as well. Ranking algorithms can be applied to various specific ranking utilities. Ranking utilities can utilize various measurements and metrics specific to the entity (e.g. device, system and/or network) to be ranked. In some embodiments, a ranking utility can use a combination of short-message content dependent and short-message content independent methods to rank sensors.

Figure 7B:
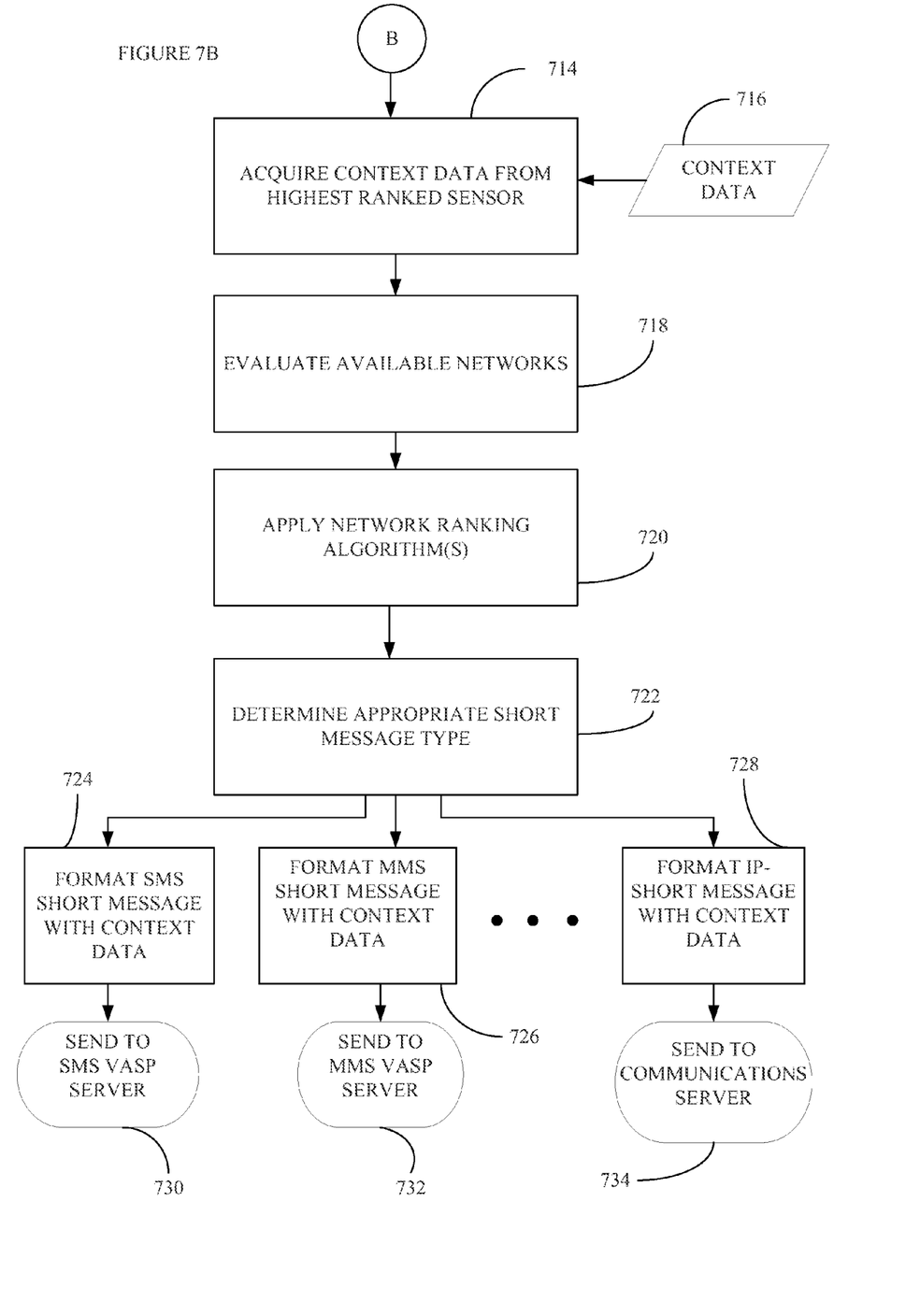
FIG. 7B illustrates a flowchart of a continuation of the example method of acquisition of context data and generation of the context-enriched short message with the mobile device in accordance with one embodiment.

FIG. 7B illustrates a flowchart of a continuation of the example method of acquisition of context data and generation of the context-enriched short message with the mobile device in accordance with one embodiment. Block 714 illustrates the acquisition of context data 716 from the highest ranked sensor. Context data 716 can be stored in a memory device of the mobile device and/or uploaded to a remote server for later retrieval. Block 718 illustrates evaluating current network availability. Network availability can be evaluated according to such metrics as available network bandwidth, cost of use of network, network type, compatibility of short message media and/or context data media with network system, a network available to an intended receiving device and the like. For example, a particular location can have an available and free 802.11 (wi-fi) network. At the same time, the location may have an attenuated 3G cellular network availability. Thus, the wi-fi network can receive a higher valuation than the cellular network. In another example, the short message may include a digital image to be sent to an image recognition functionality on a server available on the Internet. Thus, a network with access to the Internet can receive a higher valuation than a network sans Internet access. In block 720, a network ranking utility can apply a network ranking algorithm to the list of available networks. A network with the highest rank can be chosen. In block 722, an appropriate short message type is chosen that is compatible with the chosen network. For example, in blocks 724-728, the short message and context data can be formatted to a variety of available short message types as shown. Depending on the type of short message protocol to be used, a functionality of the mobile device can format the short message and the context data in a variety of formats. For example, the mobile device can physically combine context data and short message in a single message or concatenated message set of message. In another example, short message can be annotated with context data annotations. In still another example, the context data can be included as plain text. In a certain example, context data can uploaded to a server (e.g. communication server 300) and a URL to a location of the context data can be included in the short message (e.g. as hypertext) and/or as a plain text of the URL. In a particular example, context data can be included as a media of a MMS message. It can be appreciated that the embodiments are not limited in this context. In block 730-734, the short message and context data can be sent to an appropriate network entity for forwarding (and/or storing) to a recipient device (e.g. another mobile device). In some embodiments, a short message and context data can be formatted into more than one short message type. These short messages and context data can be sent to one or more servers and/or recipient devices.

In some embodiments, the short message and context data can be formatted to associate a short message component and at least one context data with a receiver device. For example, the short message component and a context data can be formatted to be explicitly linked in an information arrangement presented to a user by the receiving device. For example, the explicit linkage can include visually associated graphical elements and/or modification of a rendering of the short message text (e.g. as hypertext pointing to the associated context data). Several tangible examples of one method of graphically associating a short message component and context data are provided in U.S. patent application Ser. No. 12/691,705 filed on Jan. 21, 2010, which is hereby incorporated by reference. In some embodiments, the short message component and the context data can be formatted to invoke the GUI to present graphical metaphor of the context data. The graphical metaphor can be constructed and provided by the communications server 200. For example, communications server 200 can use an icon related to a short message component or of a sensor used to acquire the context data. The icon can be visually modified to convey a magnitude of the context data. In some embodiments, the short message component and the context data can be formatted to invoke the GUI to also include a mash-up element that includes additional information about the context data.

Although the present embodiments have been described with reference to specific example embodiments, various modifications and changes may be made to these embodiments without departing from the broader spirit and scope of the various embodiments. In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense.

What is claimed is:

1. A computer-implemented method comprising:
   identifying a term of a short message generated with a mobile device;
   determining a meaning of a component of the short message;
   selecting at least one sensor of the mobile device that measures an environmental attribute of the mobile device that is relevant to the meaning of the component of the short message;
   populating a list with the at least one sensor of the mobile device;
   sorting the list according to a specified metric;
   measuring a physical quantity of the environmental attribute of the mobile device with a first listed sensor; and
   converting the measurement into a context data.

2. The computer-implemented method of claim 1 further comprising:
   associating the context data with the term.

3. The computer-implemented method of claim 2, wherein associating the context data with the term further comprises:
   annotating the short message with a procedural markup instruction to explicitly associate the context data with the short message with a graphical user interface.

4. The computer-implemented method of claim 2, wherein associating the context data with the term further comprises:
   including the context data in a payload of a data packet used to transmit at least a portion of the short message.

5. The computer-implemented method of claim 2, wherein associating the context data with the term further comprises:
   concatenating a plurality of short message datagrams, wherein the plurality of short message datagrams comprise the short message and the context data.

6. The computer-implemented method of claim 1, wherein the specified metric comprises a signal magnitude measured by a sensor.

7. The computer-implemented method of claim 6, wherein the sensor with the largest signal magnitude is sorted as the first listed sensor.

8. The computer-implemented method of claim 1, wherein the specified metric comprises a power usage of the sensor and a remaining power value of a power source of the mobile device.

9. The computer-implemented method of claim 8, wherein the sensor with the smallest power usage is sorted as the first listed sensor.

10. The computer-implemented method of claim 9 further comprising:
    formatting the short message and the context data into a context-enriched short message.

11. The computer-implemented method of claim 10, wherein context-enriched short message type is determined according to a messaging protocol usable by an available communications network.

12. The computer-implemented method of claim 10, wherein the context-enriched short message type is determined by a messaging protocol compatible with a recipient application.

13. The computer-implemented method of claim 1, wherein the short message comprises a multimedia messaging service message.

14. The computer-implemented method of claim 1, wherein a machine is caused perform the method of claim 1 when a set of instructions in a form of a machine-readable medium is executed by the machine.

15. A method comprising:
    obtaining a short message;
    selecting a short message component;
    determining a meaning of a component of the short message;
    generating a sensor queue, wherein the sensor queue comprises at least one sensor of a mobile device that generated the short message, and wherein a physical quantity measured by the at least one sensor of the sensor queue is determined by the meaning of the short message component:
    ordering the sensor queue according to a parameter;
    measuring a physical quantity with a first-ordered sensor of the sensor queue; and
    linking the short message component with a computer-readable data representing the physical quantity.

16. The method of claim 15, wherein the parameter comprises a mobile device state.

17. The method of claim 16, wherein the parameter comprises a relevancy of the physical quantity to the short message component.

18. The method of claim 15, wherein the parameter comprises an availability of the physical quantity measured by each sensor.

19. A system comprising:
    a text-messaging component operative to generate, send and receive a text message;
    a text-message enriching component operative to associate at a sensor data with a text data;
    a context-data component to determine a meaning of a part of the text message;
    a sensor manager component operative to select a sensor component according to a selection metric and a meaning of the part of the text message, and
    a sensor component operative to acquire the context data.

20. The system of claim 19, wherein the sensor component comprises a near-field communications device of the mobile device.

21. The system of claim 19, wherein the selection metric comprises a sensor state, a mobile device component state or an attribute of an environment of the mobile device.

* * * * *